United States Patent [19]

Schofield et al.

[11] Patent Number: 5,163,692
[45] Date of Patent: Nov. 17, 1992

[54] ONE-PIECE COMPOSITE LIP SEAL

[75] Inventors: Alan P. Schofield, Placentia; Mark A. Krzemien, Long Beach, both of Calif.

[73] Assignee: Furon Company, Laguna Niguel, Calif.

[21] Appl. No.: 730,581

[22] Filed: Jul. 15, 1991

Related U.S. Application Data

[63] Continuation of Ser. No. 384,419, Jul. 24, 1989, abandoned.

[51] Int. Cl.⁵ ............................................. F16J 15/32
[52] U.S. Cl. .................................. 277/153; 277/164; 277/205
[58] Field of Search ............ 277/152, 153, 164, 188 R, 277/188 A, 205, 227

[56] References Cited

U.S. PATENT DOCUMENTS

| | | | |
|---|---|---|---|
| 2,386,873 | 10/1945 | Mercier | 277/188 R X |
| 2,687,335 | 8/1954 | Bowerman | 277/205 |
| 3,218,087 | 11/1965 | Hallesy . | |
| 3,271,038 | 9/1966 | Bastow | 277/205 |
| 3,394,939 | 7/1968 | Mastro | 277/188 A X |
| 3,443,845 | 5/1969 | Walchle et al. | 277/227 |
| 3,521,893 | 7/1970 | Josephson | 277/188 A |
| 3,561,776 | 2/1971 | Wilson . | |
| 3,848,880 | 11/1974 | Tanner . | |
| 3,851,888 | 12/1974 | Limpson, Jr. et al. . | |
| 3,901,517 | 8/1975 | Heathcott | 277/205 |
| 4,053,166 | 10/1972 | Domkowski | 277/205 |
| 4,133,542 | 1/1979 | Janian et al. | 277/164 |
| 4,231,578 | 11/1980 | Traub . | |
| 4,268,045 | 5/1981 | Traub . | |
| 4,508,356 | 4/1985 | Janian | 277/164 X |
| 4,526,385 | 7/1985 | Wheeler | 277/205 |
| 4,553,759 | 11/1985 | Kilmoyer | 277/205 X |
| 4,601,235 | 7/1986 | Roberts | 277/188 A X |
| 4,658,847 | 4/1987 | McCrone . | |
| 4,759,553 | 7/1988 | Goodman et al. . | |
| 4,850,601 | 7/1989 | Maier et al. | 277/227 X |
| 4,867,460 | 9/1989 | Colo et al. | 277/205 X |

FOREIGN PATENT DOCUMENTS

| | | | |
|---|---|---|---|
| 2318290 | 10/1973 | Fed. Rep. of Germany | 277/205 |
| 1321889 | 5/1962 | France | 277/188 R |
| 479743 | 2/1938 | United Kingdom | 277/205 |
| 797684 | 7/1958 | United Kingdom | 277/188 A |
| 1179702 | 1/1970 | United Kingdom | 277/188 R |
| 1332645 | 10/1973 | United Kingdom | 277/188 A X |
| 2029913 | 3/1980 | United Kingdom | 277/205 |

OTHER PUBLICATIONS

"Seals and Sealing Handbook": pp. 163-167, 187, and 326-388; Gulf Publ. Co.; Jul. 1986.
Flyer-Shamban Co. (undated) titled "Footseal".
Flyer-Shamban Co. (undated) titled "Hatseal II".
Flyer-Fluorocarbon Co., 1987, titled "E.S. Rod Seal".

Primary Examiner—William A. Cuchlinski, Jr.
Assistant Examiner—Scott W. Cummings
Attorney, Agent, or Firm—Christie, Parker & Hale

[57] ABSTRACT

A composite one-piece dynamic lip seal forms a dynamic ring seal between static and dynamic surfaces in a variety of applications requiring fluid sealing. The lip seal body is generally U-shaped in cross section and is principally made from a soft elastomeric material. The seal has ID and OD legs on opposite sides of a cavity in its high pressure end, forming ID and OD lips of the seal, either of which can be the dynamic leg of the seal depending upon the application. A U-shaped energizer spring is integrally bonded to the elastomer and is aligned with the U-shaped cross section of the seal so that ID and OD legs of the spring apply radial spring loading to the ID and OD legs of the seal. A reinforcing ring integrally bonded to the elastomeric body of the seal forms an exterior contact surface and an elastomeric reinforcement along a substantial length of the dynamic leg of the seal, from a low pressure end of the seal to an end spaced from the high pressure end of the seal. The reinforcing ring bonds to the elastomeric body, which then forms the contact surface on the dynamic leg of the seal continuously from the reinforcing ring to the high pressure end of the seal. The reinforcing ring is made from a fluorocarbon polymer such as PTFE with a low coefficient of friction and a high compressive modulus.

30 Claims, 3 Drawing Sheets

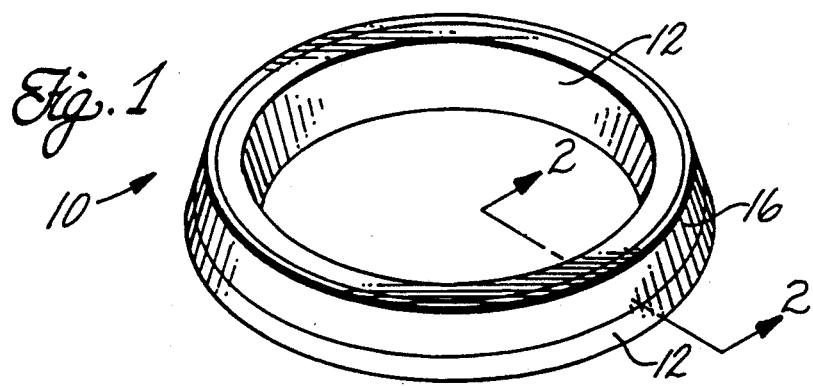
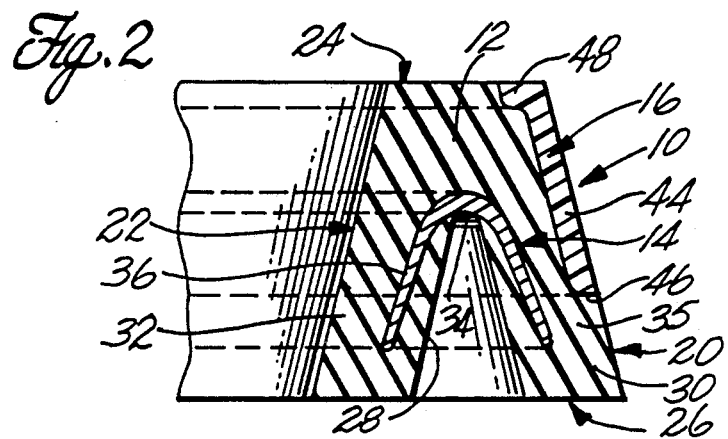
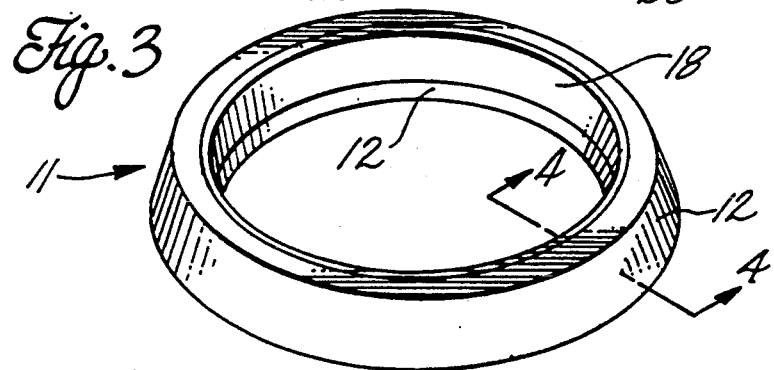
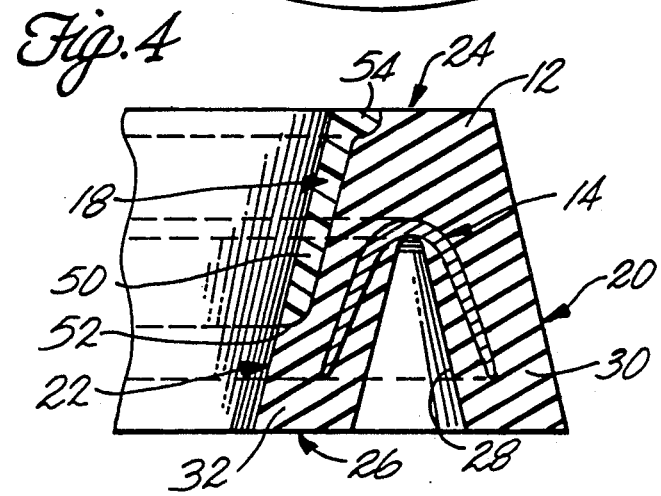

ONE-PIECE COMPOSITE LIP SEAL

CROSS-REFERENCE TO RELATED APPLICATIONS

This is a continuation of application Ser. No. 07/384,419, filed Jul. 24, 1989, now abandoned.

FIELD OF THE INVENTION

This invention relates to ring seals, and more particularly, to a one-piece composite lip seal having an integral, low friction, high modulus reinforcing ring that enhances seal performance.

BACKGROUND OF THE INVENTION

The present invention relates to elastomeric lip seals of the type including a protruding annular seal lip which is radially loaded to make constant pressure contact with a dynamic surface to which the lip is sealed. Typical applications are rod and piston seals for forming good fluid seals at low friction and high pressures. One lip seal of this type has an elastomeric jacket of generally U-shaped cross-section and a stainless steel spring energizer molded into the elastomeric jacket of the seal to form a one-piece seal. The spring provides radial loading to energize either the ID or OD lip of the elastomeric seal for its contact with the dynamic surface.

One prior art seal of this type is known as the ES seal and is sold by The Fluorocarbon Company, the assignee of this application. The ES seal has an elastomeric sealing jacket which provides excellent leakage control, particularly in single-acting piston/rod applications. The spring sustains radial loading on the seal lips, particularly at low temperatures, but also at high temperatures, where the natural resilience of the elastomer normally fades. Use of the spring energizer in the seal not only maintains continuous loading on the entire periphery of the seal lip, but also allows a high degree of flexibility and mobility for easy installation of the seal into many closed grooves.

Prior art rubber U-cup packings or seals also may have no spring energizer, in which case the rubber jacket can have thick "legs" to provide enough spring energy to the seal lips to form a reliable fluid seal. However, at both high and low temperature extremes, the legs lose some resilience, and leakage control is not as effective.

Rubber seals tend to suffer from shrinkage of the rubber at low temperatures experienced by aircraft (as low as −65° F.) which detracts from otherwise good leakage control. Fluorocarbon-type elastomers are especially susceptible to this problem.

The ES seal overcomes these problems by its use of the spring energizer, which provides an almost constant load on the seal lips, while extending both upper and lower effective operating temperatures of all elastomeric materials used for the seal.

The elastomeric seal legs tend to make the ES seal difficult to move against the dynamic surface (rod or bore) of a hydraulic cylinder under certain conditions. For instance, break-out friction forces are experienced when the seal has been standing for some time, either pressurized or unpressurized. This phenomenon is known as "stiction" or "stick-slip" which also occurs at low velocities. It is caused by lubricating film under the seal lip tending to be squeezed out due to the load on the seal lip. This effect is more pronounced with a soft seal material which conforms better to the microcontours of the hardware surface.

When high pressures are applied to the ES seal, a separate back-up ring is usually necessary to help resist "extrusion" of the heel of the seal. Extrusion is an unwanted deformation of the elastomer in which the elastomer is squeezed out of the annular groove in which it is seated. These back-up rings which resist extrusion are commonly made from polytetrafluoroethylene (PTFE), or filled PTFE, but high-modulus engineered plastics may also be used.

Another seal used in applications similar to the ES seal is sold by W. S. Shamban & Co. and known as the Hatseal. This seal comprises a Teflon slipper which has a back-up ring section. The seal has an elastomer contact which is claimed to reduce the amount of contact as pressure increases, by the pressure deforming the rubber so that the axial length of the seal is decreased. Since the Teflon (trademark of duPont) part maintains its dimensions, the rubber contact on the dynamic surface decreases. This causes lower wear on the elastomeric sealing lip, which also provides for lower friction. The Teflon component has lower friction than rubber when under pressure. The dynamic leg of the Teflon part has a back-up ring section to prevent extrusion of the elastomer. The shape of the elastomer is such that all radial vectored forces basically equalize to provide equilibrium and so that radial force with increased pressure is maintained at a minimum.

There are several disadvantages of the Hatseal. For particularly small sizes, assembly of the Teflon part is difficult because it occupies full groove depth. A subsequent design known as Hatseal II uses two Teflon parts for the back-up ring component. This design has disadvantages from tolerance stack-up, from practical manufacturing tolerances, and greater risk of misassembly due to the large number of parts. Also, with the groove on maximum depth and the Teflon parts on minimum tolerances, the resulting gap may lead to the elastomer being nibbled with continuing reversals of pressure, finally resulting in seal failure. Also, because the elastomer wipes dry on the dynamic surface, the Teflon leg suffers from a lack of lubrication and subsequent high wear reduces it to a thin, sharp sliver of Teflon. Due to movement of the rubber against the Teflon with increasing pressure, the rubber lip can be cut off by the sharp Teflon piece and result in failure of the seal.

Low temperature affects the Hatseal elastomer by shrinkage, causing loss of radial squeeze against the Teflon part, some loss of load on the rubber contact seal lip, and also some loss of resilience and speed of response. This series of effects leads to significant loss of control. The effects vary with the rubber used but are most prevalent with fluorocarbon rubber such as Viton (trademark of duPont) materials. This limits these materials to a lowest usable temperature of about −15° F.

A prior art seal designed and developed by Boeing Corporation is known as the Footseal. A variation of this seal, known as Footseal II, is sold by W.S. Shamban & Co. These seals use the same groove dimensions and basically have the same geometries, with Footseal II having some axial and more radial squeeze as an improvement over the original Footseal design. These seals consist of an L-shaped Teflon-based part energized by an O-ring. Advantages of the Footseal are low pressure driving the Teflon part toward the dynamic (rod) surface by virtue of the edge profile at the low-pressure gland wall, to provide more effective sealing. The ramp angle where the O-ring energizes the dynamic Teflon leg results in the O-ring's providing greater squeeze under pressurized conditions to provide more effective sealing. The back-up ring part of the assembly provides good resistance to extrusion to protect the O-ring.

The Footseal also has a number of disadvantages. Because of the large radial depth of the Teflon part, it is not easy to install the seal in a closed gland, particularly in small diameters. This necessitates using an open gland, which usually is more expensive, occupies more room, and has a greater weight penalty. Friction under pressure is high due to increased squeeze from the O-ring, and the cam-action of the angled wall of the gland which vectors the axial pressure load into a load perpendicular to the rod surface, thereby generating higher friction loads. The seal also suffers from loss of squeeze, resilience, and response at low temperatures due to low-temperature effects on the O-ring rubber used. A fluorocarbon rubber such as Viton is particularly affected negatively and cannot be used at temperatures below about −15° F. Further, some leakage is experienced with seals having Teflon contact only.

Thus, there is a need for an elastomeric lip seal which provides a reliable fluid seal and has good long-term wear properties, especially under temperature extremes and low lubricity conditions. Low dynamic friction, low break-out force, resistance to compression set, and resistance to extrusion of the elastomer under high operating pressures are sought-after properties that enhance seal performance. In addition, ease of installation of the seal is important.

SUMMARY OF THE INVENTION

Briefly, one embodiment of this invention comprises a dynamic ring seal in the form of a radially spring loaded composite one-piece lip seal for use in forming a fluid seal between static and dynamic surfaces of relatively movable parts. The lip seal body is principally made of an elastomeric material for forming a contact area of the seal. The seal has a low pressure end, a high pressure end, and a dynamic leg that forms the seal during use. The seal includes a spring integrally molded and bonded to the elastomeric body for energizing the dynamic leg of the seal into sealing contact during use. The seal further includes a reinforcing ring integrally molded and bonded to the elastomeric body of the seal. The reinforcing ring forms an exterior contact surface of the seal and provides an elastomer support for a substantial length of the seal's dynamic leg. The reinforcing ring extends from a low pressure end of the seal substantially continuously to an end of the reinforcing ring spaced from the high pressure end of the seal. The elastomer then forms an exterior contact surface on the dynamic leg of the seal continuously from its bond with the reinforcing ring to the high pressure end of the seal. The elastomer contact surface forms a good fluid seal during use. The reinforcing ring is made from a fluorocarbon polymer having a substantially lower coefficient of friction and a substantially higher compressive modulus than the elastomeric body of the seal. The reinforcing ring reduces the elastomer contact area of the dynamic sealing surface, thereby reducing dynamic friction and break-out force, while also providing extrusion resistance support for the softer elastomeric seal material.

The fluorocarbon polymer material of the reinforcing ring exhibits excellent wear properties under low lubricity conditions, which enhances seal performance since the reinforcing ring essentially performs under low lubricity, if not dry sealing conditions. This occurs due to the reinforcing ring being downstream from the elastomer contact area which provides a zero leak wiping condition of the fluid film during use.

Additional improvements are provided by combining the low friction and high modulus of the reinforcing ring, and by integrally bonding the elastomeric seal material to the reinforcing ring and to the metallic spring energizer. The result is a composite one-piece fluid seal which enhances ease of installation of the seal and avoids misassembly. In addition, the seal has the unexpected advantage of being more stable when assembled, when compared with prior art seals having a dynamic leg made only of the softer elastomer, which has a tendency to roll out of its assembled position during high pressure use.

Other advantages over the prior art will be described in more detail by referring to the following detailed description and the accompanying drawings.

BRIEF DESCRIPTION OF THE DRAWINGS

FIG. 1 is a perspective view of one embodiment of a composite one-piece lip seal according to principles of this invention, in which a reinforcing ring is shown on an OD leg of the seal;

FIG. 2 is a fragmentary cross-sectional view taken on line 2—2 of FIG. 1;

FIG. 3 is a perspective view illustrating an alternative form of the seal in which a reinforcing ring is shown on an ID leg of the seal;

FIG. 4 is a fragmentary cross-sectional view taken on line 4—4 of FIG. 3;

DETAILED DESCRIPTION

Figure 5:
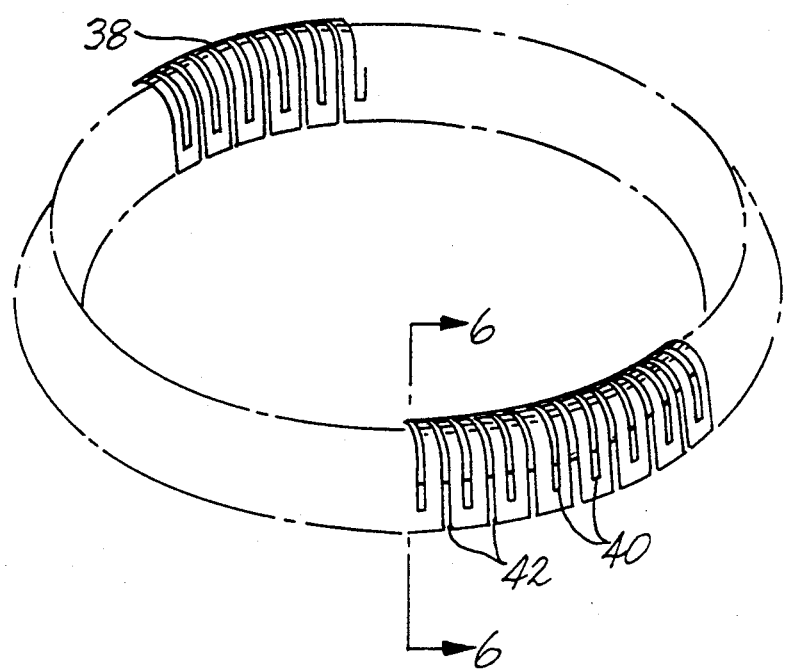
FIG. 5 is a perspective view illustrating a finger spring which comprises one means for energizing the dynamic leg of the seal.

FIGS. 1 and 2 illustrate one embodiment of a composite one-piece dynamic lip seal 10 according to principles of this invention. The seal is of multicomponent construction with its components molded and bonded together as a one-piece unit shaped as a ring shown best in FIG. 1. Components of the seal include an annular elastomeric body or jacket 12 which comprises the predominant cross sectional component of the seal, a spring energizer 14 for applying radial loading to both sides of the seal wall as described in more detail below, and a reinforcing ring 16 on the dynamic leg of the seal. In the embodiment of FIGS. 1 and 2, the dynamic leg is on the OD side of the seal 10 and therefore the reinforcing ring 16 extends around and along the outside leg of the seal. FIGS. 3 and 4 illustrate an alternative embodiment of a composite one-piece lip seal 11. In the alternative embodiment of FIGS. 3 and 4, a reinforcing ring 18 is on the ID side of the seal 11 which forms the dynamic leg of the seal in that embodiment.

Referring to the cross sections of FIGS. 2 and 4, the composite seal of this invention has an annular seal wall of generally inverted U-shaped cross sectional configuration. The seal wall has a pair of flat converging OD and ID walls 20 and 22, respectively, on the outside and inside legs of the seal. The OD wall 20 forms the exterior contact surface of the seal in the embodiment of FIG. 2; the ID wall 22 forms the exterior contact surface of the seal in the embodiment of FIG. 4. The OD and ID walls of the seal converge toward a flat, relatively shorter end wall 24 at the heel or low pressure end of the seal. On the other hand, the OD and ID walls of the seal diverge toward a flat, relatively wider end wall 26 at a high pressure end of the seal. The low pressure and high pressure ends of the seal are defined by the relatively narrower radial dimension and the relatively wider radial dimension at opposite ends of the seal, respectively. When the seal is in use, such as on a piston or piston rod, the pressure applied to the piston, i.e., during a power stroke of the piston, is in the direction of, i.e., acts on the high pressure end 26 of the seal. The low pressure end 24 of the seal is downstream from the high pressure end toward which the pressure is applied. The annular seal wall further includes a ring shaped cavity 28 which opens through the high pressure end 26 of the seal, thereby forming a pair of radially spaced apart, flexible OD and ID seal lips 30 and 32, respectively. In the illustrated embodiment, the cavity 28 is of inverted U-shaped cross sectional configuration and extends generally along the central portion of the seal wall, converging toward the low pressure end of the seal and terminating at an interior end 34 at approximately mid-height of the seal wall. The opposite faces of the cavity 28 taper toward one another at approximately the same angle of taper as the outside and inside walls 20 and 22 of the seal. Thus, the seal lips 30 and 32 are of relatively narrow, generally uniform width along the length of the seal lips. Alternatively, the seal lip on the dynamic leg of the seal can be slightly thicker than the other seal lip.

The elastomeric body 12 of the seal is preferably made from a relatively soft flexible, resilient elastomeric material suitable for use as a fluid ring seal material for applications involving the sealing of dynamic surfaces in rotary, oscillatory, helical and reciprocating modes of operation. The elastomer can be made from materials such as natural rubber; silicone rubber; ethylene-propylene terpolymer elastomer such as ethylene-propylene diene monomer (EPDM); fluoroelastomers such as the material known as Viton, a fluoroelastomer based on a copolymer of vinylidene fluoride hexafluoropropylene; a nitrile rubber such as Buna-N: or polyurethane.

The spring energizer 14 is preferably a ring-shaped spring of generally inverted U-shaped cross sectional configuration. The spring is preferably made of metal such as stainless steel and is integrally bonded to the elastomeric body of the seal so that OD and ID legs 35 and 36 of the spring, respectively, are aligned with the OD and ID lips 30 and 32 of the elastomeric seal. The spring is integrally bonded to the elastomeric seal so that opposite legs of the spring energize the lips of the seal by normally applying and constantly sustaining a radially outward loading on each lip of the seal.

Various types of energizer springs can be used with the seal of this invention, including the F.C. spring previously used in the Fluorocarbon ES seal, and the type of tapered cross-section spring 14 shown in the drawings. U.S. Pat. No. 3,561,776, incorporated herein by this reference, illustrates various embodiments of a helically wound loading spring which also can be used with the seal of this invention. Techniques for forming the energizing spring also are disclosed in that reference.

Figure 6:
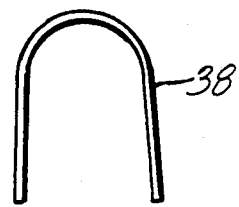
FIG. 6 is a cross-sectional view taken on line 6—6 of FIG. 5.
Figure 7:
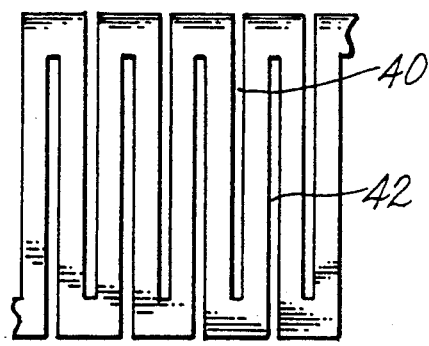
FIG. 7 is a fragmentary elevational view showing a flat form configuration of the finger spring.

FIGS. 5 through 7 illustrate another alternative energizer spring which can be used with the composite seal of this invention. This spring, which is referred to herein as a finger spring, is shown in flat form of FIG. 7 and comprises a thin, flat stainless steel strip with thin, straight alternating die cuts or gaps 40 and 42 extending inwardly from alternating opposite edges of the metal strip. The die cuts are axially spaced apart along the length of the steel strip and lie parallel to one another in an alternating fashion, thereby forming a highly flexible, undulating structure. The metal strip is coined into the inverted U-shaped cross sectional configuration of the spring, after which the ends of the strip are welded to form a ring. Following degreasing, the metal spring is treated with a suitable bonding agent for use in integrally bonding the metal spring to the elastomeric jacket during a molding step described below. In use, the finger spring has leaves with circumferentially spaced apart gaps filled with the elastomer which supports the spring during deformation, as described in more detail below.

The reinforcing ring 16 is integrally molded and bonded to the dynamic leg of the seal. In the embodiment illustrated in FIGS. 1 and 2, the OD leg 20 forms the dynamic leg of the seal during use. A typical use of this seal is for a piston seal in which the seal is seated in an annular piston groove and the OD leg of the seal is in sealing contact with the cylinder wall. Alternatively, the reinforcing ring 18 can be molded and bonded to the ID leg 22 of the seal which can be the dynamic leg of the seal in such instances where the seal is seated in an annular groove in a cylinder wall and seals to a piston rod extending through the seal.

The reinforcing ring 16 or 18 principally comprises an elongated, thin wall 44 of substantially uniform width which converges from the high pressure end toward the lower pressure end of the seal to match the taper of the OD or ID wall of the seal. The entire surface of the reinforcing ring in contact with the elastomer is integrally molded and bonded to the elastomeric body of the seal according to techniques described below. The elongated wall 44 of the reinforcing ring, which is also referred to as a "slipper," extends substantially continuously from the low pressure end wall 24 of the seal along the exterior OD wall 20 of the seal for at least about one-half, and preferably up to about 95% of the length of the OD wall 20. The end of the reinforcing ring at 46 is spaced from the high pressure end 26 of the seal. The exterior sealing surface of the OD leg of the seal, continuously from the end 46 of the reinforcing ring to the high pressure end wall 26 of the seal, is formed by the relatively softer elastomeric body of the seal.

The reinforcing ring 16 preferably includes a short radial leg 48 which, in the illustrated embodiment, extends radially from the exterior dynamic surface of the seal inwardly a short distance along the low pressure end of the seal. The short radial leg 48 on the reinforcing ring can extend up to about 60% to 70% of the radial width of the low pressure end of the seal wall. The radial leg resists extrusion of the elastomer during use. It also has advantages in avoiding the need for a separate back-up ring. This provides space saving advantages because the seal can be used in grooves of smaller cross-section. It also avoids misassembly problems that can happen when a separate back-up ring is used.

In the alternative arrangements shown in FIGS. 3 and 4, the reinforcing ring 18 is of similar but reversed configuration to that of reinforcing ring 16. As shown best in FIG. 4, the reinforcing ring 18 has a thin, uniform diameter slipper wall 50 extending a majority of the length of the ID leg 22 of the seal substantially continuously from the low pressure end 24 of the seal to a lower end 52 spaced from the high pressure end 26 of the seal. The reinforcing ring 18 also includes a short radial leg 54 at the low pressure end of the seal.

The reinforcing rings 16 and 18 are preferably made from a low friction fluorocarbon polymer also having a reasonably high compressive modulus. In one embodiment, the material from which the reinforcing ring is made has a coefficient of friction of about 0.1 or less, and a compressive modulus of at least about 57,000 psi. The preferred fluorocarbon polymer is polytetrafluoroethylene (PTFE). A PTFE having a 50 Shore D hardness or more also is preferred, the presently preferred hardness range being about 50 Shore D to about 80 Shore D. The reinforcing ring can be made from PTFE containing a variety of fillers, generally in the range from about 2% to about 60% by weight. Typical fillers that can be used in the PTFE reinforcing ring are carbon, graphite, bronze, molybdenum disulfide, ground glass or milled glass fibers, a plastic such as polyethylene sulfide, e.g. Ryton, or a poly-p-oxy benzoate plastic, e.g. Ekonol. The use of PTFE as the principal component of the reinforcing ring is preferred because of its high gel temperature in addition to its low coefficient of friction and high compressive modulus. This material also is capable of being integrally bonded to the elastomeric material contained in the main body of the seal. Other fluorocarbon materials which can be used for the reinforcing ring are perfluoroalkoxyethylene (PFA), or fluorinated ethylene propylene (FEP).

In a preferred process for making the seal, the entire outer surface of the reinforcing ring is first degreased, using trichloroethylene, acetone, or the like. The entire outer surface of the ring is then etched, preferably using a sodium naphthalene etching fluid such as that sold under the mark Tetra-Etch by Gore Associates, Flagstaff, Ariz.

The surface of the ring to be bonded to the elastomer is then treated with a bonding agent to enhance integral bonding between the reinforcing ring and the elastomer. A preferred bonding agent is a silane-based adhesive sold under the mark Chemlok by Lord Elastomer Products, Erie, Pa. Use of different Chemlok adhesives for the reinforcing ring varies as follows, depending upon the type of elastomer used in the seal:

| Elastomer | Chemlok Adhesive |
| --- | --- |
| Buna-N | 220 |
| Viton | 607 |
| EPDM | 607 |
| Silicone | 608 |

Bonding treatment for the energizer spring comprises first degreasing using trichloroethylene, acetone, or the like, followed by applying a fluid bonding agent such as the silane-based Chemlok adhesive. The spring energizer is also treated with the following bonding agents, depending upon the type of elastomer to which the spring is bonded:

| Elastomer | Chemlok Adhesive |
| --- | --- |
| Buna-N | 205, followed by 220 |
| Viton | 607 |
| EPDM | 607 |
| Silicone | 608 |

The spring and reinforcing ring are then placed in a mold of compression, transfer, injection or melt casting type, along with a preform of uncured elastomer. The presently preferred mold process uses a compression mold or a transfer mold. The elastomer preform contains curing agents, and molding is carried out at elevated temperatures and under pressure so as to cure the elastomer while causing the elastomer to flow in the mold and bond to the reinforcing ring and the spring. Preferably, mold pressures up to about 6,000 psi can be used, for a compression mold. Mold temperature varies as follows, depending upon the elastomer used:

| Elastomer | Temperature (°F.) |
| --- | --- |
| Buna-N | 315 |
| Viton | 360 |
| EPDM | 360 |
| Silicone | 320 |

The elastomer flows sufficiently in the mold and cures while bonding to the spring and ring, assisted by the bonding agents, to integrally mold and bond to the entire outer surfaces of the spring and reinforcing ring.

Figure 8:
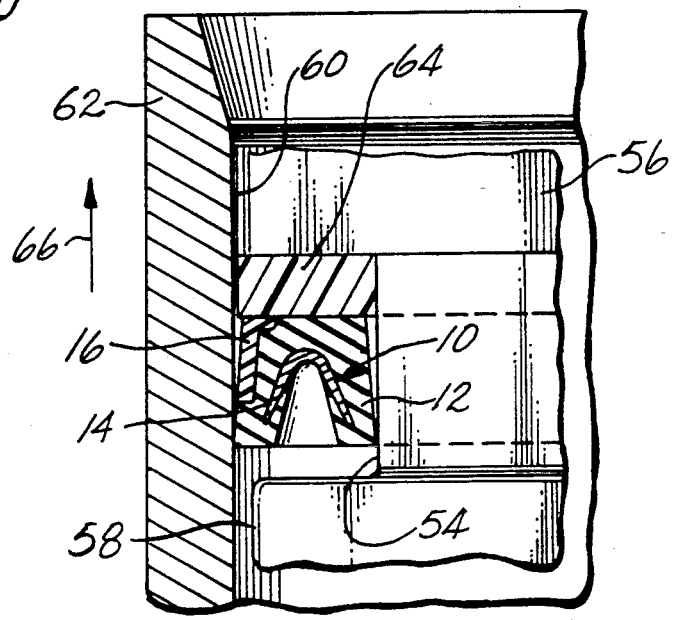
FIG. 8 is a fragmentary cross-sectional view illustrating a use of the seal shown in FIG. 1 and 2 as a piston seal.
Figure 9:
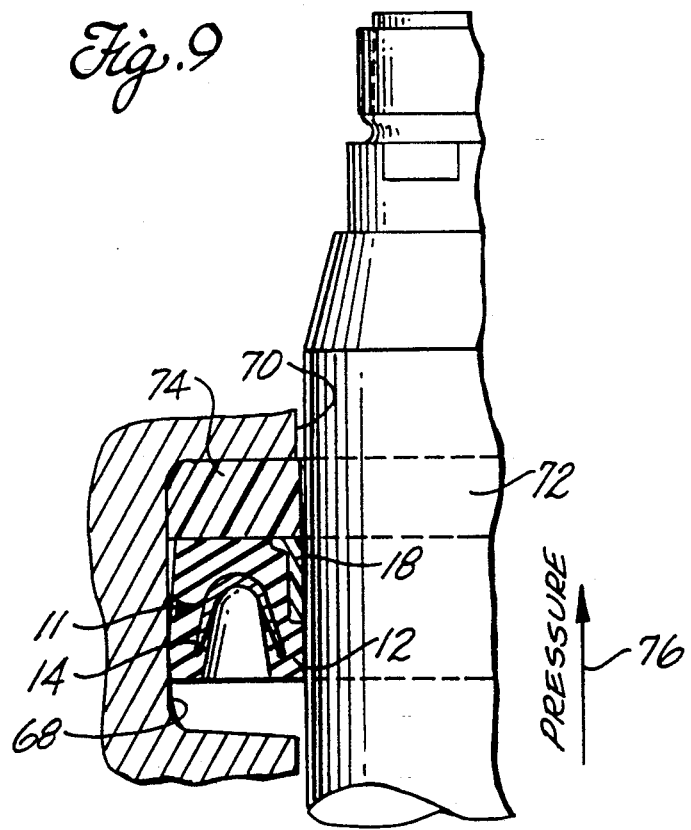
FIG. 9 is a fragmentary cross-sectional view illustrating use of the seal shown in FIGS. 3 and 4 as a piston rod seal.

FIGS. 8 and 9 illustrate typical uses of the seal of this invention. FIG. 8 illustrates use of the seal 10 as a piston seal in which the reinforcing ring 16 is on the OD leg of the seal. The seal 10 is placed in an annular groove 54 in the outer surface of a piston 56. The outer surface 58 of the piston is spaced inwardly from the bore wall 60 of a cylinder 62. The seal is shown mounted in the groove 54 along with a back-up ring 64. In other embodiments the seal 10 can be used in such applications without a back-up ring. Pressure is applied and the direction of the arrow 66 during use, and the reinforcing ring 16 is on the dynamic side of the seal in contact with the bore wall 60.

FIG. 9 shows an alternative use of the composite seal in which the seal 11 is used as a piston rod seal. In this embodiment, the seal is mounted in an annular groove 68 formed in the wall of a bore 70 through which the piston rod 72 reciprocates. The ID leg of the seal forms the fluid seal contact with the OD of the piston rod 72. The embodiment of FIG. 9 also illustrates use of the seal with a back-up ring 74, although in an alternative embodiment the seal of this invention can be used in the same application without a back-up ring. Pressure is applied in the direction of the arrow 76, and the ID leg of the seal seals to the OD of the piston rod, with the reinforcing ring of the seal being on the downstream or low pressure end of the seal's dynamic leg.

In another embodiment, the seals 10 and 11 can be used for sealing a double-acting piston (not shown), in which case one pair of seals is reversed in position relative to the other pair to provide a positive seal on each pressure stroke of the piston and piston rod. It is preferable to use separate grooves for each seal, but a common groove can be used for a pair of seals for low pressure applications.

During use, the low friction anti-extrusion reinforcing ring improves seal performance. The reinforcing ring not only reduces the elastomer contact area of the dynamic sealing surface, thereby reducing dynamic friction and break-out force; but it also provides extrusion resistance support for the softer elastomeric seal material. The reinforcing ring being used on the dynamic leg of the seal reduces friction drag. The low coefficient of friction of the reinforcing ring material, compared to the elastomeric seal, dramatically reduces seal drag. Further, because of the hardness of the reinforcing ring (at least about 50 Shore D) and because of the lower friction, stick-slip is eliminated during use. Break-out friction is also significantly reduced, and tests have shown a reduction of about six times compared with the ES seal. The increased radial section of the reinforcing ring at the seal heel provides increased support to the elastomer part to further resist extrusion due to pressure during use.

The bonded-in PTFE reinforcing ring, in combination with the spring energizer, allows use of a narrow elastomeric sealing lip. The reinforcing ring may be used for seals to suit grooves principally previously designed for O-rings and with zero, one or two back-up rings.

The metal U-shaped spring provides a constant energy to the seal lips throughout a wide temperature range during use. The seal design makes it possible to use fluorocarbon rubber such as Viton for the elastomeric component of the one-piece seal which can increase low temperature uses to about −65° F.

The U-shaped spring, such as the finger spring illustrated in FIGS. 5 through 7, provides good flexibility to the seal to assist installation and avoid misassembly of the seal during use. During the molding process the elastomer flows between the leaves of the finger spring, filling the gaps and strengthening the bond between the elastomer and the spring. The finger spring enhances flexibility of the finished seal, and the elastomer supports the spring under distortion which prevents damaging the seal during installation.

The PTFE reinforcing ring also makes the seal more stable when assembled and avoids a rolling action of the seal cross-section during assembly and under pressure.

The seal also limits the amount of elastomer to the inside U-shape of the spring. As a result, the seal does not experience the same volume shrinkage as a solid rubber energizer. Also, the remaining thin rubber legs of the seal are sufficiently flexible for the spring to provide sufficient force to maintain an effective seal at all temperatures within the specified range.

Because the reinforcing ring is bonded to the elastomer, the movement interaction due to pressure does not result in the reinforcing ring cutting into the elastomeric part of the seal. The reinforcing ring has a smooth shape where the elastomer is bonded to it. This comprises smooth curves and transition angles (shown in FIGS. 2 and 4) to allow good flow characteristics to the elastomer during molding. It also provides for less dramatic changes in shape to result in lower internal stresses during pressurizing.

The elastomeric part of the heel may be designed to ensure a clearance between the reinforcing ring and the dynamic surface so as to provide the lowest possible friction at low pressure. A slight interference may otherwise be designed to provide permanent contact between the reinforcing ring and the dynamic surface to ensure good resistance to the extrusion of the elastomer at all times during use. This also eliminates any tolerance stack-up problem.

A high modulus plastic insert (not shown) may be used in the seal heel to tier the design to resist extrusion at extreme high temperatures and pressures. This extra insert may or may not be bonded to the elastomer depending on gland design and performance requirements. In a preferred embodiment, the high modulus plastic insert is integrally molded and bonded to the elastomer, in the positions of the back-up rings 64 or 74 (see FIG. 8 and 9) to form an integral one-piece seal. High modulus plastics that can be used for the seal insert include polyamide, polyamide-imide, polyetheretherketone, polyetherketone, polyimide, and acetol.

The seal is capable of use at extremely high temperatures up to about 450° F., or at temperatures as low as about −65° F., with a high temperature elastomer such as a fluorocarbon copolymer elastomer.

The positive sealing characteristics of the lip seal make it suitable for application where a closed volume of oil is used and where very low leakage is allowed such as in brake systems, shock absorbers, landing gear struts and the like.

The seal by virtue of the U-cup shape is pressure activated, i.e., as pressure increases, the pressure by being present in the U-shape of the seal provides a higher load to the seal legs to provide greater sealing efficiency.

What is claimed is:

1. A composite one-piece lip seal for forming a dynamic ring seal between static and dynamic surfaces of relatively movable parts, the lip seal body being made of an elastomeric material, the seal having a relatively narrower radial low pressure end and a relatively wider radial high pressure end and a dynamic leg extending between the low pressure and high pressure ends to form the seal's contact surface to said dynamic surface during use, the seal including spring means for energizing the dynamic leg of the seal in its sealing contact, the seal further including a reinforcing ring having an L-shaped cross-section integrally molded and bonded to the elastomeric body of the seal, the long leg of the L being relatively thin and of substantially uniform width and forming an exterior surface and an elastomer reinforcement means along at least one-half the length of the dynamic leg of the seal, the long leg of the L extending from the low pressure end of the seal to a location spaced less than about one-half the distance from the seal's high-pressure end with the elastomeric body which extends beyond the end of the long leg of the L forming the contact surface on the dynamic leg of the seal continuously from the end of the reinforcing ring to the high pressure end of the seal, the reinforcing ring including a radial leg which extends inwardly a short distance along the low pressure end of the seal, the outer surface of the radial leg being flush with the surface of the low pressure end of the seal, said reinforcing ring being made from a fluorocarbon polymer having a lower coefficient of friction and a higher compressive modulus than the elastomer.

2. Apparatus according to claim 1 in which the spring means comprises a finger spring molded and bonded to the elastomer, the finger spring having circumferentially spaced apart gaps filled with the elastomer to support the finger spring during deformation.

3. Apparatus according to claim 1 in which the spring means is metal.

4. Apparatus according to claim 1 wherein the reinforcing ring has a relatively smooth shape comprising smooth curves and transition angles where it is bonded to the elastomeric body of the seal.

5. Apparatus according to claim 1 wherein the long leg of the L extends along the exterior portion of the dynamic leg of the seal continuously from its top at the seal's low pressure end to its bottom at a location about 75% to about 95% of the distance from the seal's low pressure end.

6. A composite one-piece dynamic lip seal for forming a dynamic ring seal between static and dynamic surfaces, the lip seal body being generally U-shaped in cross section and being principally made from an elastomeric material, the seal having ID and OD legs on opposite sides of a cavity in its high pressure end, forming ID and OD legs of the seal, either of which can be the dynamic leg of the seal during use, the seal including an energizer spring integrally molded and bonded to the elastomer so that the spring energizes the dynamic leg of the seal; and a reinforcing ring having an L-shaped cross-section integrally molded and bonded to the elastomer body of the seal, the long leg of the L being relatively thin and of substantially uniform width, extending along an exterior portion of the dynamic leg of the seal from a low pressure end of the seal to its bottom at a location spaced less than about one-half the distance from the seal's high pressure end, the long leg of the L thereby forming an exterior contact surface an a means of reinforcement of the elastomer along at least one-half the length of the dynamic leg of the seal, with the elastomer extending beyond the long leg of the L forming the contact surface on the dynamic leg of the seal continuously from the end of the reinforcing ring to the high pressure end of the seal, the reinforcing ring including a radial leg which extends inwardly a short distance along the low pressure end of the seal, the outer surface of the radial leg being flush with the surface of the low pressure end of the seal, said reinforcing ring being made from a fluorocarbon polymer having a substantially lower coefficient of friction and a substantially higher compressive modulus than the elastomeric body of the seal.

7. Apparatus according to claim 6 in which the reinforcing ring has a coefficient of friction less than about 0.1 and a compressive modulus greater than about 57,000 psi.

8. Apparatus according to claim 7 in which the reinforcing ring is made from a material selected from the group consisting of PTFE, PFA, or FEP, without fillers.

9. Apparatus according to claim 7 in which the reinforcing ring is made from a material selected from the group consisting of PTFE, PFA or FEP, with fillers.

10. Apparatus according to claim 6 in which the seal is carried by a piston and has its OD leg sealed against a cylinder bore.

11. Apparatus according to claim 6 in which the ID leg of the seal is sealed around a piston rod.

12. Apparatus according to claim 6 in which the elastomer is bonded to the reinforcing ring by an etching and adhesive bonding process.

13. Apparatus according to claim 6 in which the elastomer is molded and bonded to the spring and the reinforcing ring in a molding process under applied heat and pressure for flowing the elastomer into contact with the spring and reinforcing ring.

14. Apparatus according to claim 6 in which the energizer spring is metal.

15. Apparatus according to claim 6 wherein the reinforcing ring has a relatively smooth shape comprising smooth curves and transition angles where it is bonded to the elastomeric body of the seal.

16. Apparatus according to claim 6 wherein the long leg of the L extends along the exterior portion of the dynamic leg of the seal continuously from its top at the seal's low pressure end to its bottom at a location about 75% to about 95% of the distance from the seal's low pressure end.

17. A composite one-piece dynamic lip seal for use between adjacent dynamic and static surfaces of relatively movable parts, the composite seal being generally of a ring shape and having a seal wall which in cross section is defined by converging inside and outside legs, a relatively narrower low pressure end wall toward which the inside and outside legs of the seal converge, and a cavity in a relatively wider, high-pressure end of the seal forming a pair of seal lips on ID and OD sides of the seal wall, thereby forming a generally U-shaped cross section, the seal being adapted so that either the ID or OD leg of the seal acts as the dynamic leg of the seal during use, the body of the seal wall being comprised predominantly of an elastomeric material; the seal wall further including a ring-shaped spring of generally U-shaped cross section having ID and OD legs, the spring being integrally molded and bonded to the elastomeric body of the seal with the legs of the spring aligned generally with the U-shaped cross section of the seal wall so that the ID and OD legs of the spring energize the ID and OD lips of the seal; and a reinforcing ring having an L-shaped cross-section integrally molded and bonded to the elastomeric body of the seal, the long leg of the L being relatively thin and of substantially uniform width, and extending along an exterior portion of the dynamic leg of the seal continuously from the seal's low pressure end to its bottom at a location spaced less than about one-half the distance from the seal's high pressure end so that an exterior portion of said elastomeric body forms the dynamic leg of the seal continuously from its top at the bottom of the long leg of the L to the seal's high-pressure end, the short leg of the L being a radial leg which extends inwardly a short distance along the low pressure end of the seal, the outer surface of the radial leg being flush with the surface of the low pressure end of the seal, said reinforcing ring being made of a fluorocarbon polymer having a substantially lower coefficient of friction and a substantially higher compressive modulus than the elastomeric body of the seal.

18. Apparatus according to claim 17 in which the reinforcing ring is on the ID leg of the seal.

19. Apparatus according to claim 17 in which the reinforcing ring is on the OD leg of the seal.

20. Apparatus according to claim 17 in which the spring comprises a finger spring.

21. Apparatus according to claim 17 in which the coefficient of friction of the reinforcing ring is less than about 0.1.

22. Apparatus according to claim 17 in which the compressive modulus of the reinforcing ring is greater than about 57,000 psi.

23. Apparatus according to claim 17 in which the reinforcing ring has a Shore D hardness of greater than about 50.

24. Apparatus according to claim 17 in which the reinforcing ring predominantly comprises PTFE.

25. Apparatus according to claim 17 in which the reinforcing ring extends along a substantial length of the dynamic leg of the seal.

26. Apparatus according to claim 17 in which the OD leg of the seal is on a piston sealed in a cylinder bore.

27. Apparatus according to claim 17 in which the ID leg of the seal is sealed around a piston rod.

28. Apparatus according to claim 1 in which the ring-shaped spring is metal.

29. Apparatus according to claim 17 wherein the reinforcing ring has a relatively smooth shape comprising smooth curves and transition angles where it is bonded to the elastomeric body of the seal.

30. Apparatus according to claim 17 wherein the long leg of the L extends along the exterior portion of the dynamic leg of the seal continuously from its top at the seal's low pressure end to its bottom at a location about 75% to about 95% of the distance from the seal's low pressure end.

* * * * *

UNITED STATES PATENT AND TRADEMARK OFFICE
CERTIFICATE OF CORRECTION

PATENT NO. : 5,163,692

DATED : November 17, 1992

INVENTOR(S) : Alan P. Schofield; Mark A. Krzemien

It is certified that error appears in the above-identified patent and that said Letters Patent is hereby corrected as shown below:

On the title page, item:

[56] References Cited, U.S. Patent Documents, line 12, change "4,053,166  10/1972  Domkowski" to -- 4,053,166  10/1977  Domkowski --.
Other Publications, line 2, change "326-388" to -- 326-328 --.

Column 1,  line 30,  change "The Fluorocarbon Company" to -- Furon Company --;
Column 4,  line 43,  change "FIG." to -- FIGs. --;
Column 8,  line 21,  after "used" delete the comma;
Column 10, line 13,  change "FIG." to -- FIGs. --;

Column 11, lines 24-25, change "elastomer" to -- elastomeric --;
Column 11, line 31, after "surface" change "an" to -- and --;

UNITED STATES PATENT AND TRADEMARK OFFICE
CERTIFICATE OF CORRECTION

PATENT NO. : 5,163,692
DATED : November 17, 1992
INVENTOR(S) : Alan P. Schofield, et al.

It is certified that error appears in the above-indentified patent and that said Letters Patent is hereby corrected as shown below:

Column 14, line 1, change "claim 1" to --claim 17--.

Signed and Sealed this

Seventh Day of June, 1994

Attest:

BRUCE LEHMAN

Attesting Officer     Commissioner of Patents and Trademarks